United States Patent [19]

Shane et al.

[11] Patent Number: 5,342,494
[45] Date of Patent: Aug. 30, 1994

[54] HIGH PURITY HYDROGEN AND OXYGEN PRODUCTION AND APPARATUS THEREFOR

[75] Inventors: Eric M. Shane, Simsbury; James F. McElroy, Suffield, both of Conn.

[73] Assignee: United Technologies Corporation, Hartford, Conn.

[21] Appl. No.: 26,938

[22] Filed: Mar. 5, 1993

[51] Int. Cl.$^5$ .................... C25B 13/04; C25B 13/08
[52] U.S. Cl. .................... 204/252; 204/296; 427/243; 427/299; 427/322; 521/30
[58] Field of Search ............ 204/296, 252; 521/27, 521/30; 427/243, 299, 322

[56] References Cited
U.S. PATENT DOCUMENTS 4,959,132 9/1990 Fedkiw, Jr. .................... 204/291

FOREIGN PATENT DOCUMENTS 0061200 5/1977 Japan .................... 204/296

Primary Examiner—Kathryn Gorgos
Attorney, Agent, or Firm—Pamela J. Curbelo

[57] ABSTRACT

The production of high purity oxygen and hydrogen gases can be accomplished utilizing an electrolysis assembly comprising an anode, a cathode, an ion exchange membrane disposed therebetween, an anode chamber, and a cathode chamber. This ion exchange membrane has been multiply impregnated with catalyst and therefore contains internal catalyst sites where hydrogen gas, which diffuses through the ion exchange membrane from the cathode chamber, and oxygen gas, which diffuses through the ion exchange membrane from the anode chamber, react to form water. Reacting the hydrogen and oxygen gases within the ion exchange membrane prevents these gases from contaminating the oxygen stream in the anode chamber and the hydrogen stream in the cathode chamber, respectively.

5 Claims, 1 Drawing Sheet

HIGH PURITY HYDROGEN AND OXYGEN PRODUCTION AND APPARATUS THEREFOR

TECHNICAL FIELD

The invention relates to the production of hydrogen and oxygen gases, and especially to the production of high purity hydrogen and oxygen gases using a water electrolyzer having an ion exchange membrane with an internal catalyst.

BACKGROUND OF THE INVENTION

An electrolysis cell is a mechanical assembly for electrolyzing water to hydrogen and oxygen gas. To meet hydrogen and oxygen production requirements, a plurality of electrolysis cells are assembled in electrical series to form a cell stack. Referring to FIG. 1, each electrolysis cell comprises an anode catalyst 1, a cathode catalyst 3, an ion exchange membrane 5 disposed therebetween, an anode chamber 7, and a cathode chamber 9. During operation, water is introduced to the anode chamber 7 where it contacts the anode catalyst 1 and is electrolyzed to hydrogen ions, oxygen and free electrons. The hydrogen ions migrate through the ion exchange membrane 5 to the cathode catalyst 3 where they are recombined with the free electrons which flow through an external circuit 11 to the cathode catalyst 3, thereby producing hydrogen gas.

During hydrogen and oxygen gas production, some of the oxygen gas in the anode chamber 7 diffuses through the ion exchange membrane 5, escapes recombination with hydrogen on the cathode catalyst 3, and flows into the cathode chamber 9, thereby reducing the purity of the hydrogen gas. Similarly, a portion of the hydrogen gas in the cathode chamber 9 diffuses through the ion exchange membrane 5, escapes recombination on the anode catalyst 1, and flows into the anode chamber 7, thereby reducing the purity of the oxygen gas. Although this diffusion is minimal and the oxygen and hydrogen gases are substantially pure, typically only containing about 10 ppm to about 100 ppm contaminants, this purity is inadequate for many state-of-the-art applications such as hydrogen used for processing in the semiconductor industry, hydrogen utilized in the manufacture of artificial diamonds, and hydrogen utilized as a carrier gas in flame ionization equipment, among others. These applications require very high quality oxygen and hydrogen gases, typically exceeding about 99.999%. This purity level is one order of magnitude greater than the purity of hydrogen and oxygen produced in commercially available water electrolysis cells.

Consequently, attainment of high purity oxygen and hydrogen gases has been addressed by installing purification equipment downstream of the water electrolyzer. An example of such a device is a palladium separator which allows only the hydrogen molecules to pass. Other devices, such as deoxygenation units and recombiners, remove oxygen and hydrogen respectively. Although the desired purity is obtained with these devices, system complexity, reliability, and costs are negatively impacted.

What is needed in the art is an improved electrolysis cell capable of consistently producing high purity hydrogen and oxygen gases having a purity of about 99.999% or greater.

DISCLOSURE OF THE INVENTION

The present invention relates to an improved ion exchange membrane and method for making the same, and an improved electrolysis cell. The method comprises first conditioning the ion exchange membrane by exchanging hydrogen ions in the membrane with replacement cations. The replacement cations are then exchanged with catalyst ions which are converted to their metal form. These steps are then repeated at least once to form a multiply impregnated membrane. Any remaining replacement cations in the multiply impregnated membrane are then replaced with hydrogen.

The improved electrolysis cell has an anode catalyst, a cathode catalyst, an anode chamber and a cathode chamber. The improvement comprises the ion exchange membrane which is multiply impregnated with catalyst as described above.

The present invention further relates to a method for producing high purity oxygen and hydrogen gases. This method comprises introducing water to the anode chamber of the electrolysis cell described above such that the water is electrolyzed at the anode catalyst to hydrogen ions, free electrons, and oxygen gas. The hydrogen ions migrate through the ion exchange membrane to the cathode catalyst while the free electrons pass through an external circuit to the cathode catalyst. At the cathode catalyst, the hydrogen ions and free electrons are recombined to form hydrogen gas. Some of the hydrogen and oxygen gas produced migrates through the ion exchange membrane toward the anode and cathode respectively. The hydrogen and oxygen gas which diffuse through the ion exchange membrane are reacted at the catalyst located within the ion exchange membrane. As a result, the catalyst in the ion exchange membrane inhibits the hydrogen and oxygen gas from passing to the anode and cathode chambers, respectively, and from contaminating the oxygen and hydrogen gas streams.

The foregoing and other features and advantages of the present invention will become more apparent from the following description and the accompanying drawings.

These figures are meant to be exemplary and not to limit the scope of the present invention.

BEST MODE FOR CARRYING OUT THE INVENTION

Figure 2:
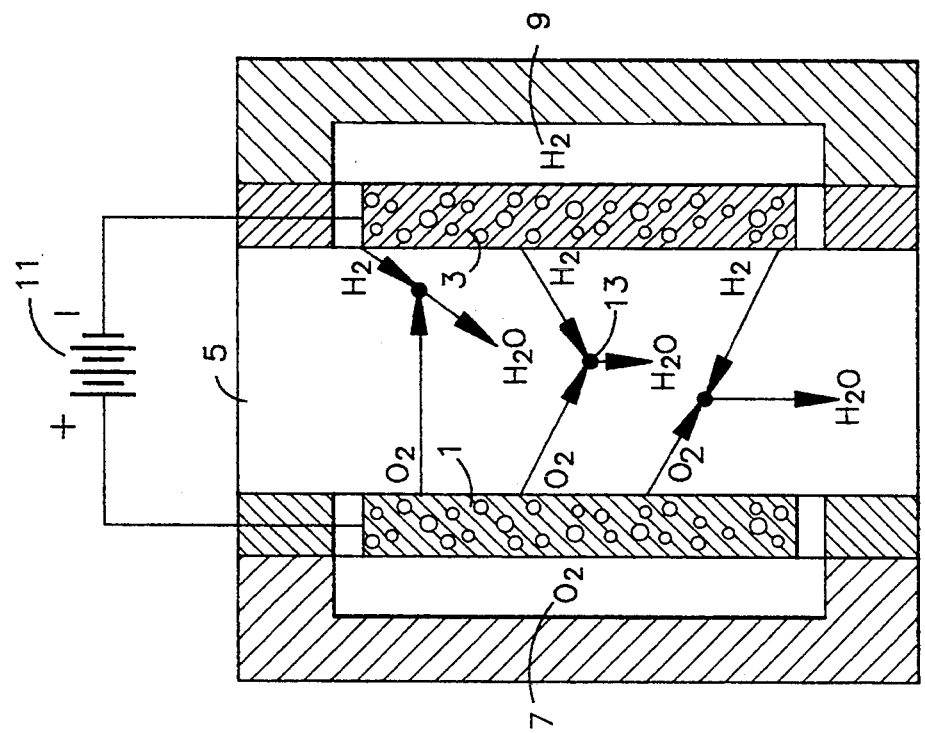
FIG. 2 is an illustration of the water electrolysis cell of the present invention having an ion exchange membrane with an internal catalyst.
Figure 1:
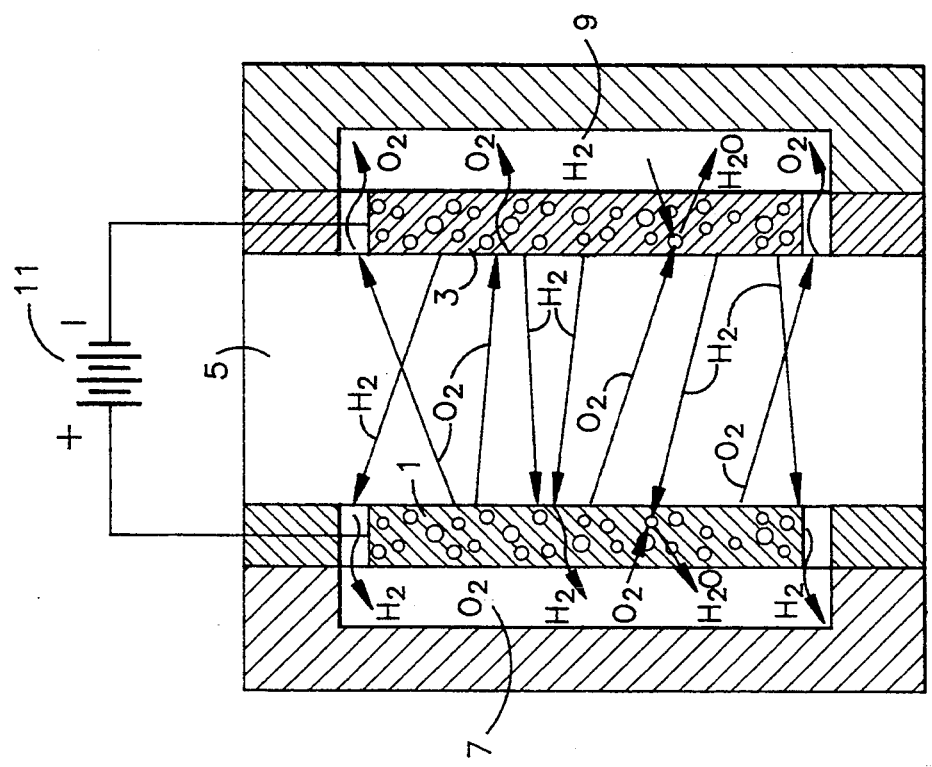
FIG. 1 is a prior art water electrolysis cell.

The present invention is directed toward the production of high purity, about 99.999% pure or greater, oxygen and hydrogen gases. The high purity production is accomplished in a water electrolysis cell having an ion exchange membrane with an internal catalyst 13. (see FIG. 2) As is discussed above, the purity of the hydrogen and the oxygen gases produced in conventional water electrolyzers is reduced due to migration of hydrogen and oxygen molecules across the ion exchange membrane and release of this hydrogen and oxygen into the opposing streams. With an internal ion exchange membrane catalyst, the hydrogen and oxygen which migrate through the ion exchange membrane contact the catalyst and are combined to form water.

Consequently, they are prevented from contaminating the opposing streams.

The ion exchange membrane of the present invention is comprised of a conventional ion exchange membrane which has been impregnated with a catalyst. This ion exchange membrane should be capable of transferring ions and be compatible with the electrolysis cell environment, such as a fluorocarbon membrane. One possible membrane is NAFION®, a perfluorocarbon ion exchange membrane produced by E. I. du Pont de Nemours & Co. (Inc.) of Wilmington, Del. Other conventional membranes can be employed, such as FLEMION®, a perfluorocarbon membrane produced by Asahi Glass Corporation, Tokyo, Japan.

The membrane catalyst located within the ion exchange membrane is typically a platinum catalyst due to platinum's ability to impregnate the ion exchange membrane and to facilitate a reaction between hydrogen and oxygen to form water. It is believed that other catalysts including metals and alloys, such as the noble metals and their alloys, which are capable of combining hydrogen and oxygen to form water and which can be impregnated into the ion exchange membrane, may be employed.

Initial impregnation of the ion exchange membrane with the membrane catalyst requires the membrane to be in a form which facilitates movement of membrane catalysts, in the form of ions, into the membrane. Consequently, the ion exchange membrane is preferably conditioned prior to the introduction of the catalyst ions. Conditioning comprises preferentially exchanging the hydrogen ion of the membrane's acid group, i.e. sulfonic or carboxylic group, with replacement cations which are larger than the hydrogen ions. This replacement allows the membrane to more readily accept the catalyst ions.

For example, the membrane is soaked in a conditioner, such as solution of sodium hydroxide (0.1 normal sodium hydroxide/water solution), or potassium hydroxide (0.1 normal potassium hydroxide/water solution), to convert the membrane from the hydrogen ion form to the sodium or potassium form, respectively. Once the membrane has been converted, it is rinsed, typically with deionized water, to remove any excess conditioner. The conditioned membrane is then contacted with, preferably submerged in, solution containing the catalyst ions, i.e. a platinum plating solution, such that catalyst ions exchange with the replacement cations which entered the membrane during conditioning. One such platinum plating solution is ENGELHARD® 209 produced by Engelhard Industries of East Newark, N.J. which has a platinum concentration of about 6 grams per liter.

The conditioned membrane should be submerged in the catalyst solution for a sufficient period of time to allow the exchange of the replacement cations with the catalyst ions to come to equilibrium, up to about 4 hours, typically about 0.75 hours to about 1.5 hours. Equilibrium can be determined by monitoring the concentration of the catalyst solution. When the concentration remains constant, the exchange in the conditioned membrane between the replacement cations and the catalyst ions has reached equilibrium, and the membrane is considered saturated with the catalyst ions. Although the impregnation of the conditioned membrane can be performed at room temperature (about 25° C.), it is preferred to heat the plating solution to about 40° C. to about 80° C. in order to accelerate the exchange rate. The saturated membrane is rinsed, typically with distilled water, and heated to about 40° C. to about 80° C. in water to remove excess catalyst solution.

After the excess catalyst solution has been removed, it is necessary to convert the impregnated catalyst ions to their metal form, thereby forming the catalyst. Although any conventional method of converting the catalyst ions which will not adversely effect the ion exchange membrane, can be employed, the membrane is typically submerged in a reducing solution for a sufficient period of time to reduce substantially all of the catalyst ions to metal. Typically, up to about 60 minutes is sufficient reduction time, with about 40 to about 60 minutes preferred. Although this reduction period can be diminished by heating the solution, safety factors related to the excessive rate of hydrogen evolution render heating the solution undesirable. Possible reducing solutions include reducing agents such as formaldehyde, hydrogen gas, sodium borohydride, and other conventional means.

Subsequent catalyst impregnation into the membrane occurs after the catalyst ions have been converted to metal. Therefore, the impregnated ion exchange membrane is again conditioned to replace additional hydrogen ions with replacement cations, the impregnated membrane is submerged in catalyst solution to exchange the replacement ions with catalyst ions, and the catalyst ions are converted to metal.

The desired amount of catalyst impregnated into the membrane is a function of the amount of catalyst necessary to convert the cross-over hydrogen and oxygen ions to water and the amount which will form an electrical circuit through the ion exchange membrane which can cause electrical shorting of the electrolysis cell during operation when an electrical current is applied to the cell to convert the water to hydrogen and oxygen. Due to equilibrium constants in the system which take into account the type of membrane to be impregnated and the catalyst, only about 0.086 grams of platinum (per square foot per mil; gm $Pt/ft^2/mil$) is impregnated into a NAFION or FLEMION ion exchange membrane per impregnation. Consequently, in order to attain the desired purity of the hydrogen and oxygen gases, the ion exchange membrane should be impregnated with the catalyst in at least two impregnation proceedures.

After impregnation with sufficient catalyst ions and reduction of the catalyst ions to metal, the ion exchange membrane is preferably rinsed to remove excess reducing solution and to reconvert the membrane to the hydrogen form. Reconversion to the hydrogen form comprises replacing any remaining replacement cations in the membrane with hydrogen ions by applying strong acid rinses to the membrane. For example, the membrane can be submerged in sulfuric acid, hydrochloric acid, nitric acid, phosphoric acid, or hydrofluoric acid, for up to about 2 hours, preferably about 10 minutes to about 1 hour. The membrane is preferrably submerged in sulfuric acid since sulfuric acid does not leave halogens, such as chlorine, on the membrane which can degrade other components of the electrolysis cell. This process is can be repeated to ensure complete conversion of the membrane to the hydrogen form.

Finally, now that it has been impregnated with the catalyst and converted back to the hydrogen form, the membrane is equilibrated in water, preferably distilled water, at about 80° C. to about 110° C. for about 20 minutes to about 65 minutes to adjust the water content of the membrane to the desired water concentration. As the ion exchange membrane water content decreases, the resistivity for ion transport through the membrane increases. Therefore, equilibrating the water content in the ion exchange membrane improves the membrane's ion conductivity, and thereby its efficiency.

The present invention will be clarified with reference to the following illustrative examples. These examples are given to illustrate the process of forming the catalyst impregnated ion exchange membrane. Example I describes the prior art method of converting singly impregnating an ion exchange membrane with catalyst. Example II, on the other hand, describes the method of multiply impregnating an ion exchange membrane with catalyst. The examples are not, however, meant to limit the scope of the present invention.

EXAMPLE I

The following procedure was used to singly impregnate a NAFION ion exchange membrane with approximately 0.086 gm $Pt/ft^2$/mil thick.

1. A 5.0 inch by 5.0 inch by 0.090 inch membrane was placed in a tray containing 10 mils of 0.1N NaOH/$in^2$ of membrane for about 30 minutes at room temperature to convert the membrane to the sodium form.
2. The membrane was transferred to a fresh solution of sodium hydroxide for about one hour.
3. The membrane was thoroughly rinsed with distilled water to remove any excess sodium hydroxide.
4. Engelhard 209 platinum plating solution was diluted with distilled water at a ratio of 1 ml plating solution to 4 ml water.
5. An amount of 5 ml of the diluted plating solution per square inch of membrane was added to the rinsed membrane.
6. The submerged membrane was heated at about 60° C. for approximately one hour keeping the membrane covered with solution at all times to preferentially exchange the sodium replacement cations with platinum ions.
7. The membrane was rinsed thoroughly with distilled water and then heated in distilled water to 60° C. for about 8 minutes and then cooled to room temperature, about 1 hour.
8. An amount of 8 grams of sodium borohydride was dissolved in 92 ml of 0.1N sodium hydroxide.
9. Under a ventilated hood, 5 ml of the sodium borohydroxide solution per square inch of membrane was added to the membrane in a shallow tray. The membrane was kept submerged in the sodium borohydroxide solution for 60 minutes to convert the platinum ions to platinum metal.
10. The membrane was then thoroughly rinsed in distilled water.
11. The membrane was re-exchanged in 0.5 liters per square foot of 1.5 normal sulfuric acid solution for about 30 minutes to convert the membrane back to hydrogen form.
12. The process in step 11 was repeated with fresh sulfuric acid solution.
13. The membrane was rinsed and soaked thoroughly in distilled water for about 30 minutes.
14. The membrane was equilibrated in distilled water at about 100° C. for about 30 minutes.

EXAMPLE II

The following procedure was used to twice impregnate a NAFION ion exchange membrane with approximately 0.172 gm $Pt/ft^2$/mil thick.

Example I, steps 1–10 were followed to initially impregnate the membrane with platinum and reduce the platinum ions to platinum metal. The impregnated membrane was then subsequently impregnated with platinum by repeating steps 1–10 of Example I. Once the membrane had been subsequently impregnated with platinum ions which were reduced to platinum metal, steps 11–14 of Example I were followed to convert the subsequently impregnated membrane back to the hydrogen form.

The membranes formed in Example I and II were tested in a water electrolysis cell. The oxygen content of the hydrogen stream was monitored at flow rates of about 250 cc/min. The water electrolyzer utilizing the Example I membrane had 13.1 ppm oxygen in the hydrogen stream. In contrast, the water electrolyzer utilizing the Example II membrane only had 9.9 ppm of oxygen in the hydrogen stream. The Example II membrane is an about 25% improvement over the Example I membrane.

The ion exchange membrane of the present invention is capable of producing substantially pure oxygen and hydrogen gases. Due to the presence of the catalyst in the ion exchange membrane, the water electrolyzer of the present invention produces hydrogen and oxygen gases having a purity level up to and exceeding one order of magnitude greater than prior art water electrolyzers; 99.99% pure versus 99.999% (or greater) pure.

In addition to improved product purity, the water electrolyzer of the present invention has increased ion exchange membrane life. Again, due to the presence of the catalyst in the ion exchange membrane, free radicals which oxidize and thereby degrade the ion exchange membrane, are oxidized on the catalyst, thereby preventing them from oxidizing the ion exchange membrane.

Although the present invention has been shown and described with respect to detailed embodiments thereof, it will be understood by those skilled in the art that various changes in form and detail thereof may be made without departing from the spirit and scope of the claimed invention.

We claim:
1. A method for forming a catalyst impregnated fluorocarbon ion exchange membrane, comprising the steps of:
   a. conditioning the ion exchange membrane by exchanging hydrogen ions in the membrane with replacement cations;
   b. exchanging said replacement cations with platinum catalyst ions;
   c. reducing said catalyst ions to platinum metal;
   d. repeating steps "a" through "c" at least once to form a multiply impregnated membrane; and
   e. exchanging any remaining replacement cations in said multiply impregnated membrane with hydrogen and
   f. equilibrating said multiply impregnated membrane wherein the platinum metal is present in the form of discrete and isolated particles within the membrane.

2. A catalyst impregnated fluorocarbon ion exchange membrane having a surface area and a thickness, which is formed in a method comprising:

a. conditioning the ion exchange membrane by exchanging hydrogen ions in the membrane with replacement cations;
   b. exchanging said replacement cations with platinum catalyst ions;
   c. converting said platinum catalyst ions to platinum metal, wherein steps "a" through "c" serve to impregnate the membrane with metal in an amount up to about 0.086 grams per square foot per millimeter of membrane;
   d. repeating steps "a" through "c" at least once to form a multiply impregnated membrane;
   e. exchanging any remaining replacement cations in said multiply impregnated membrane with hydrogen; and
   f. equilibrating said multiply impregnated membrane, wherein the platinum metal is present in the form of discrete and isolated particles within the membrane.

3. An improved electrolysis cell for producing high purity oxygen and hydrogen gases, said electrolysis cell having an anode catalyst, a cathode catalyst, an anode chamber and a cathode chamber, wherein said improvement comprises said catalyst impregnated ion exchange membrane of claim 2.

4. A catalyst impregnated ion exchange membrane as in claim 2 where steps "a" through "c" are repeated once.

5. An improved electrolysis cell for producing high purity oxygen and hydrogen gases, said electrolysis cell having an anode catalyst, a cathode catalyst, an anode chamber and a cathode chamber, wherein said improvement comprises said catalyst impregnated ion exchange membrane of claim 4.

* * * * *